March 24, 1936.   W. R. PERRY   2,035,402
CONTROLLER
Filed April 9, 1931   3 Sheets-Sheet 1

Inventor
William R. Perry,

By Hood & Hahn.
Attorneys

March 24, 1936.  W. R. PERRY  2,035,402
CONTROLLER
Filed April 9, 1931  3 Sheets-Sheet 2
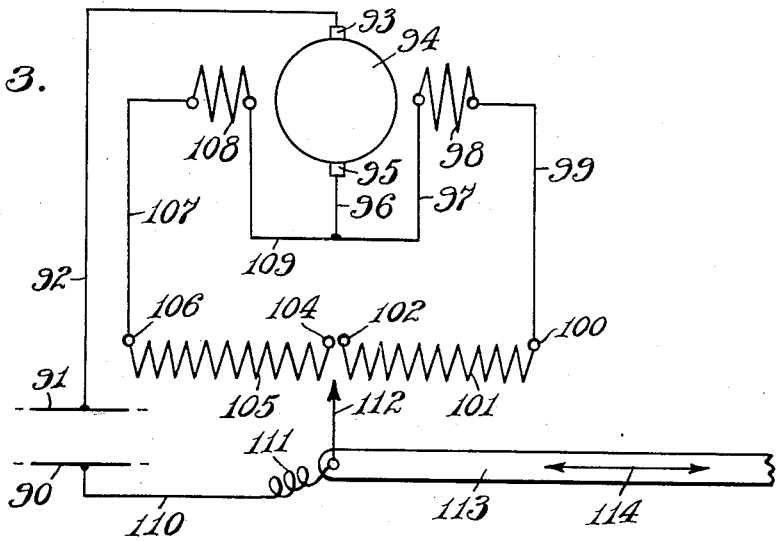
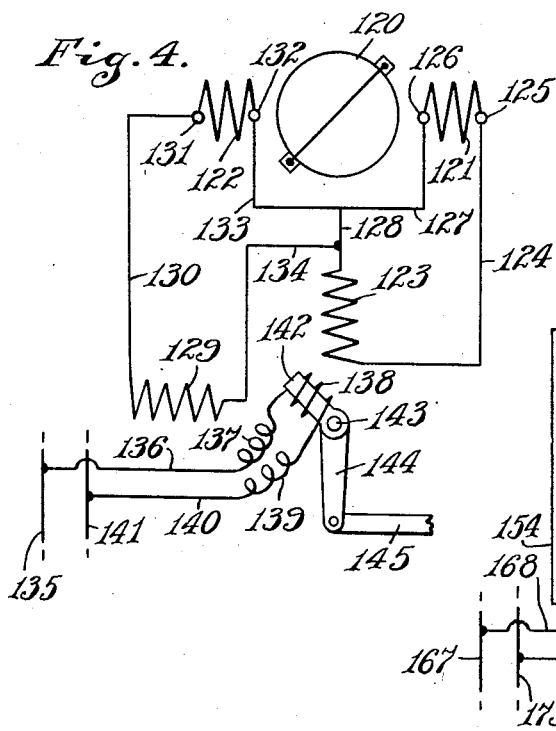
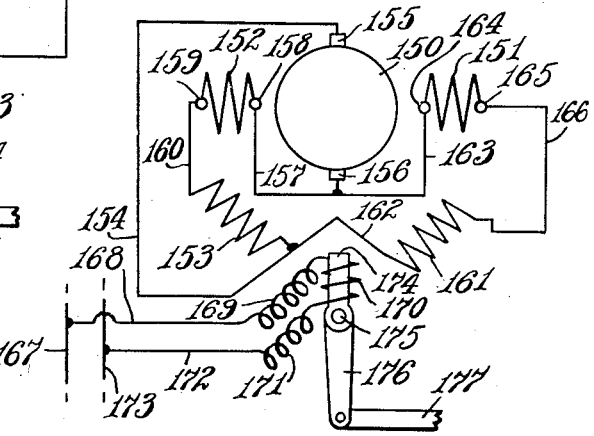
Inventor
William R. Perry,
By Hood & Hahn.
Attorneys March 24, 1936.                    W. R. PERRY                    2,035,402
                                   CONTROLLER
                               Filed April 9, 1931            3 Sheets-Sheet 3
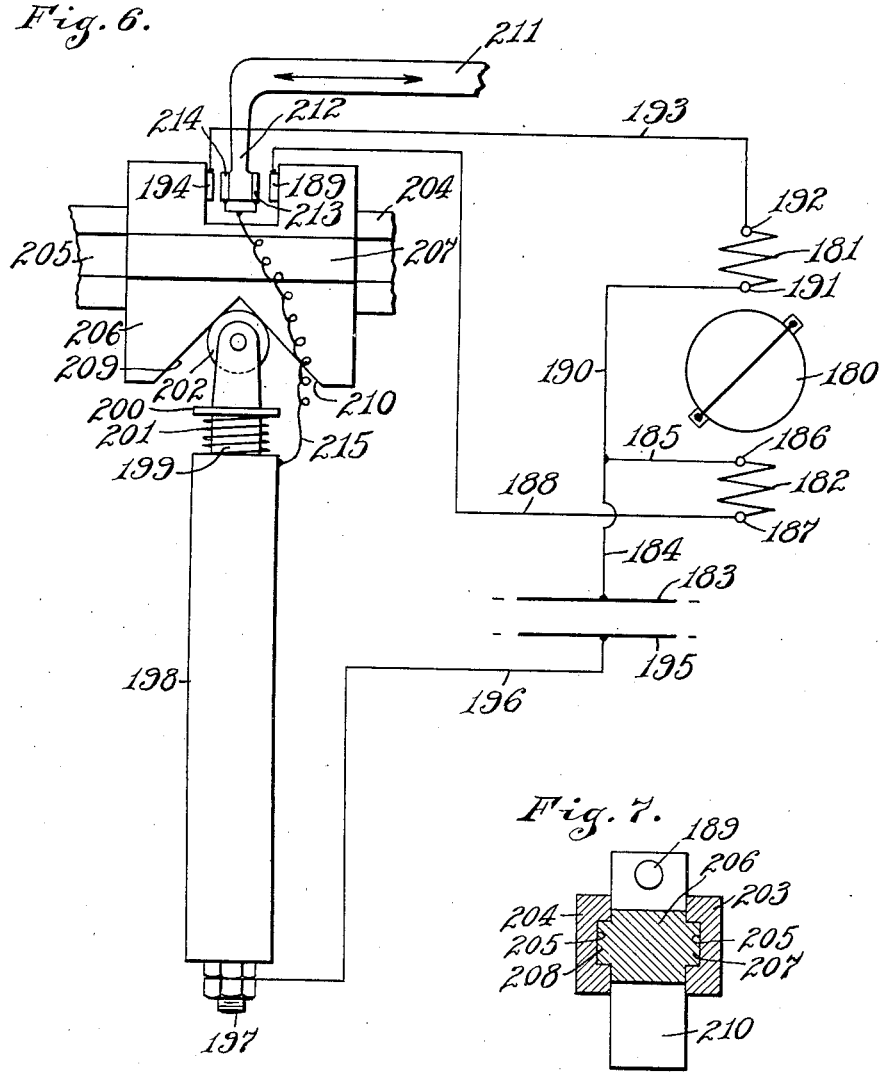
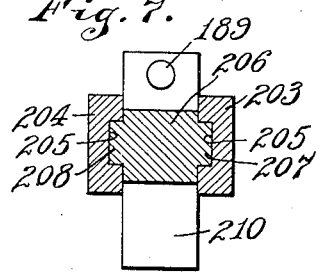
Inventor
William R. Perry,
By Hood + Hahn.
Attorneys Patented Mar. 24, 1936

2,035,402

UNITED STATES PATENT OFFICE 2,035,402

CONTROLLER

William R. Perry, Columbus, Ind., assignor to Reeves Pulley Company, Columbus, Ind., a corporation of Indiana Application April 9, 1931, Serial No. 528,867

21 Claims. (Cl. 74—230.17)

The present application relates to a controller, and more particularly to an automatic controller for operating the shiftable elements of a variable speed transmission.

A primary object of the invention is to provide mechanism, responsive to the demands of a driven load, for automatically operating a variable speed transmission to supply power to the load at required speeds. A further object is to provide mechanism of the character indicated which shall be capable of responding to demands of the driven load by shifting the controlling elements of the transmission throughout the range of those elements in infinitesimal increments. Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In the drawings, the novel controller has been illustrated as applied to the control of a variable speed transmission of the type which has come to be universally known as the "Reeves" transmission, but it is to be understood that the controller may be adapted, within the scope of my invention, to controlling variable speed transmissions of other types.

Figs. 3, 4, and 5 are diagrammatic illustrations of still further embodiments of my invention;

Fig. 6 is a diagrammatic illustration of a still further embodiment of my invention; and Fig. 7 is a transverse sectional view of a detail thereof.

Figure 1:
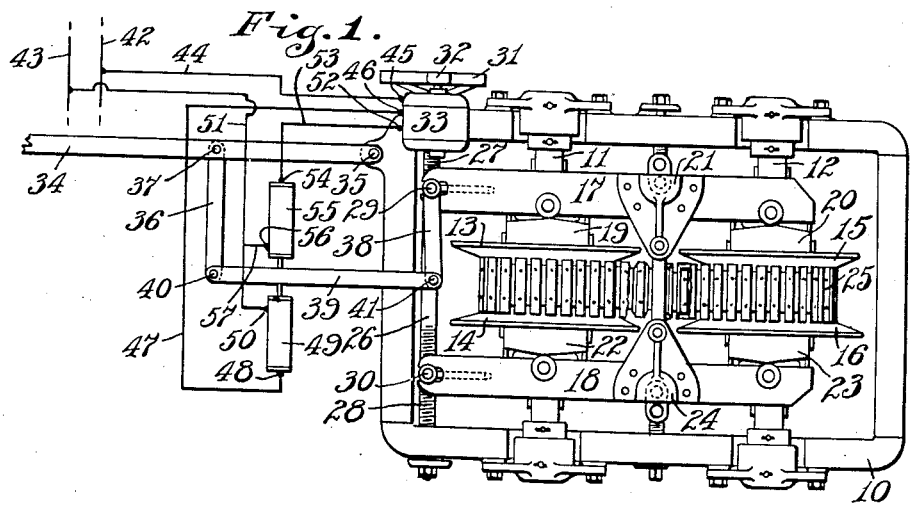
Fig. 1 is a plan view of a "Reeves" type transmission, a controller of one type embodying my invention being shown, more or less diagrammatically, applied thereto.

Referring more particularly to Fig. 1, it will be seen that I have illustrated a "Reeves" type variable speed transmission comprising a frame 10 in which are mounted an intake shaft 11 and an output shaft 12. The shaft 11 carries a pair of cone discs 13 and 14, and the shaft 12 carries a similar pair of cone discs 15 and 16. Control arms 17 and 18 cooperate respectively with thrust bearings 19 and 20 associated with the discs 13 and 15, and with thrust bearings 22 and 23 associated with discs 14 and 16, the arm 17 being oscillatably mounted as at 21, and the arm 18 being similarly mounted as at 24. An edge active belt 25 cooperates with the four discs. Further and more detailed description of the transmission unit is deemed to be unnecessary, since this unit is well known in the art.

A shaft 26, oppositely threaded at its opposite ends, as at 27 and 28, is mounted in the frame 10, and a block 29 threaded on the portion 27 cooperates with the adjacent end of the arm 17, while a block 30 threaded on the portion 28 cooperates with the adjacent end of the arm 18. A gear 31 is carried at one end of the shaft 26 and is adapted to be driven by a pinion 32 on the shaft of a reversible electric motor 33.

Figure 2:
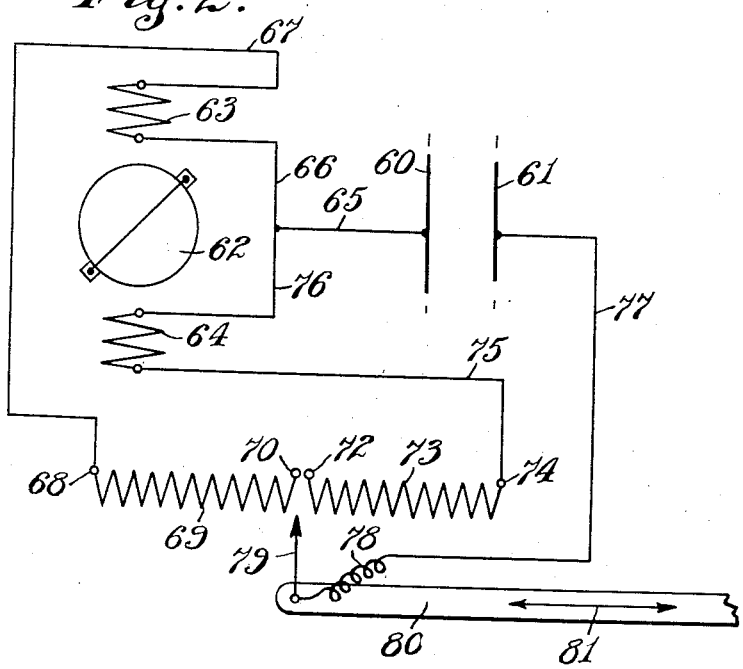
Fig. 2 is a diagrammatic illustration of another embodiment of my invention.

In the embodiment illustrated in Fig. 1, the motor 33 is of the double wound repulsion type, being similar to the motor diagrammatically illustrated in Fig. 2.

A lever 34 is pivoted at 35 to a stationary point, which may be advantageously a portion of the frame 10. As shown in the drawings, the outer end of the lever 34 is broken away, but it is to be understood that said lever 34 is connected to be operated in accordance with the demands of the driven load, though said lever may be arranged for manual operation. A link 36 is pivoted at its one end to the lever 34 intermediate the ends thereof, as at 37. A similar link 38 has its one end pivoted to the block 29. A third link 39 has its one end pivoted to the free end of the link 36, as at 40, and has its opposite end pivoted to the free end of the link 38, as at 41.

A source of electrical energy is diagrammatically illustrated as a pair of wires 42 and 43. A wire 44 leads from the line 42 to the common terminal 45 of the motor 33. What will be called the forward terminal 46 of the motor 33 is connected by a wire 47 to one terminal 48 of a carbon-pile rheostat 49, to the opposite terminal 50 of which is connected a wire 51 leading to the line 43, so that a constantly closed circuit exists as follows:—Line 42, wire 44, terminal 45, forward winding of motor 33, terminal 46, wire 47, terminal 48, rheostat 49, terminal 50, wire 51, and line 43.

The terminal 52 of the motor 33 is connected through a wire 53 to one terminal 54 of a second carbon-pile rheostat 55, the opposite terminal 56 of which is connected through a wire 57 to the wire 51, and so to the line 43. Thus a constantly closed circuit is established as follows:—Line 42, wire 44, terminal 45, reverse winding of motor 33, terminal 52, wire 53, terminal 54, rheostat 55, terminal 56, wire 57, wire 51, and line 43.

The two windings of the motor 33 being connected in parallel closed circuits, each of which includes one of the rheostats 49 or 55, it will be obvious that, so long as the degree of compression of the carbon-piles in the two rheostats is equal, the potentials of the two circuits including the respective windings will balance each other, thus preventing operation of the motor. If, however, the potentials in the two circuits become unbalanced, the preponderance of electromotive force in one winding over that in the other will cause operation of the motor in the same manner as though only the first winding were energized.

When the lever 34 is moved in a counter clockwise direction as viewed in Fig. 1, the linkage system 36, 39, 38 is shifted about the block 29, the end of the link 39 which is connected to the link 36 being moved downwardly to compress the carbon-pile of the rheostat 49. Obviously, such movement likewise relieves the pressure upon the carbon-pile of the rheostat 55. What has been termed the forward winding of the motor 33 is thus put in control, and the motor is operated in a counter clockwise direction, as viewed from the bottom of Fig. 1, to drive the shaft 26 in a clockwise direction. Such rotation of the shaft 26 will, because of the opposite threading of its portions 27 and 28, move the block 29 upwardly as viewed in Fig. 1, and move the block 30 downwardly, as viewed in Fig. 1. Such movement is, of course, transmitted to the arms 17 and 18 to cause the discs 15 and 16 to approach each other and to permit the discs 13 and 14 to separate, thus decreasing the speed of rotation of the shaft 12 with respect to the shaft 11.

The block 29, when thus moved, carries with it the link 38, thus moving the end of the link 39 attached to said link 38 upwardly to relieve the excess pressure on the carbon-pile of the rheostat 49 and to compress the carbon-pile of the rheostat 55. Obviously, as movement of the block 29 thus shifts the link 39, the potentials in the circuits controlled by the respective rheostats 49 and 55 approach a balanced condition. As these potentials become more and more nearly balanced, the speed of the motor 33 is decreased until finally, when the two circuits come into balance, the motor will stop.

As will be obvious, the speed and direction of rotation of the motor 33 may thus be controlled by the lever 34.

In Fig. 2, I have illustrated diagrammatically a second embodiment of my invention. In said figure there is illustrated a source of power represented by the line wires 60 and 61; a split stator type of reversible repulsion motor 62 having opposite windings 63 and 64; and suitable wiring therefor.

A wire 65 leads from the line 60 to a wire 66 connected to one terminal of one winding 63 of the motor, the opposite terminal of which is connected by a wire 67 to one terminal 68 of a rheostat coil 69, the opposite terminal of which is indicated at 70. One terminal of a second rheostat coil 73 is indicated at 72, the opposite terminal 74 of said coil 73 being connected by a wire 75 to one terminal of the motor winding 64, the opposite terminal of which is connected by a wire 76 to the above mentioned wire 65. The opposite side 61 of the supply line is connected by a wire 77 through a flexible lead 78 to a contact arm 79 mounted upon an element 80 movable in opposite directions as indicated by the arrow 81 to control the operation of the motor 62. As will be obvious, the element 80 corresponds to the lever 34 of Fig. 1, but is longitudinally movable instead of being pivoted.

As will be clear from an inspection of the figure, if the element 80 is shifted toward the right as viewed in Fig. 1, the contact arm 79 will move correspondingly in contact with the rheostat coil 73 to establish a circuit through said coil, and such movement, if continued, will reduce the resistance to current flow through such circuit which may be traced as follows:—Line 60, wire 65, wire 76, motor winding 64, wire 75, coil 73, contact arm 79, lead 78, wire 77, and line 61 to effect operation of the motor 62 under the control of the winding 64. Obviously, movement of the element 80 toward the left as viewed in Fig. 2 will correspondingly result in operation of the motor 62 under the control of the winding 63.

The opposite end of the element 80 is intended to be suitably connected for actuation in response to rotation of the shaft 26, whereby operation of the motor 62 will neutralize the effect of external shifting of the element 80.

Fig. 3 illustrates a somewhat similar organization in which, however, there is included a split field reversible series motor adapted for alternating or direct current operation. In this embodiment, I have illustrated line wires 90 and 91, the line wire 91 being connected by a wire 92 to one terminal 93 of the motor 94, the opposite terminal 95 of which is connected by a wire 96 to a wire 97 leading to one field coil 98, the opposite end of which is connected by a wire 99 to one terminal 100 of a resistor or rheostat 101, the opposite terminal of which is indicated at 102. One terminal of a second resistor 105 is indicated at 104, the opposite terminal 106 of said resistor 105 being connected by a wire 107 to a second field coil 108 for the motor 94, said coil 108 being connected by wire 109 to the wire 96. The line wire 90 is connected by a wire 110 through a flexible lead 111 to a contact finger 112 carried upon a shiftable element 113, said element being movable in opposite directions as indicated by the arrow 114. The operation of this embodiment is substantially identical with the operation of the embodiment illustrated in Fig. 2, and detailed description thereof is believed to be unnecessary.

In Fig. 4 I have illustrated a further embodiment of my invention. In this figure I have shown a split stator reversible repulsion motor 120 having field windings 121 and 122. A coil 123 has its one end connected by a wire 124 to one terminal 125 of the field winding 121, the opposite terminal 126 of which is connected by a wire 127 to a wire 128 connected to the opposite end of the coil 123. A second coil 129, somewhat removed from the coil 123 and having its axis disposed substantially at right angles to the axis of coil 123, has its one end connected by a wire 130 to one terminal 131 of the field winding 122. The opposite terminal 132 of said winding is connected by a wire 133 with the wire 128 to which is connected a wire 134 leading to the opposite end of the coil 129.

A source of electrical energy is illustrated as the wires 135 and 141. A wire 136 connects the line 135 through a flexible lead 137 to a coil 138, the opposite end of which is connected through a flexible lead 139 and the wire 140 to the line wire 141.

The coil 138 is mounted upon an arm 142, said arm being mounted for oscillation about an axis 143. A lever 144 is connected to oscillate the arm 142, and an operating element 145 is provided, said element being under the control of the driven load and responsive to shifting of the control element of the variable speed transmission.

As will be obvious, the coil 138 is always live, and is so positioned that it may be swung into axial alignment selectively with the coil 123 or the coil 129. In the position illustrated, the live coil 138 is in a substantially central position, wherein the induced potentials in the coils 123 and 129 are balanced. Obviously oscillation of the arm 142 in a clockwise direction will increase the potential induced in the coil 123 and will decrease the induced potential in the coil 129, so that the motor 120 will be actuated under the control of the field winding 121, said winding being energized through a circuit as follows: Coil 123, wire 124, winding 121, wire 127, and wire 128. If, now, the arm 142 is oscillated in a counter clockwise direction into substantial axial alignment with the coil 129, the motor 120 will be operated in the opposite direction under the influence of the field winding 122, said winding being energized through a circuit as follows: Coil 129, wire 130, winding 122, wire 133, wire 128, and wire 134. Obviously, both the speed and direction of rotation of the motor 120 will be controlled by the position of the arm 142, since the speed of rotation will be controlled by the degree of overbalance between the potentials in the two coils 123 and 129.

The embodiment illustrated in Fig. 5 is quite similar to that illustrated in Fig. 4, except that a split field reversible series motor 150 having field windings 151 and 152, is illustrated in Fig. 5. A coil 153 has its one end connected by a wire 154 to one terminal 155 of the motor 150. The opposite terminal 156 of said motor is connected by a wire 157 to one terminal 158 of the field winding 152, the opposite terminal 159 thereof being connected by a wire 160 to the opposite end of the coil 153. A second coil 161 has its one end connected by the wire 162 to the wire 154, and so to the motor terminal 155. The motor terminal 156 is connected through a wire 163 to one terminal 164 of the field winding 151, the opposite terminal 165 of said winding being connected by a wire 166 to the opposite end of the coil 161.

A line wire 167 has connected thereto a wire 168 leading, through a flexible lead 169, to a coil 170, said coil being connected, through a flexible lead 171 and a wire 172 to the opposite line wire 173, so that the coil 170 is always live. The coil 170 is mounted upon an oscillatable arm 174 movable about an axis 175 by a lever 176 to which is connected an operating member 177.

The operation of the embodiment illustrated in Fig. 5 is substantially identical with the operation of that illustrated in Fig. 4.

In Figs. 6 and 7 I have illustrated still another embodiment of my invention. The motor 180 is provided with forward and reverse windings 181 and 182, respectively. One side 183 of a source of electrical energy is connected, by a wire 184, and another wire 185, to one terminal 186 of the coil 182, the opposite terminal 187 of which is connected by a wire 188 to a contact element 189. A wire 190 connects the wire 184 leading from the line 183, to one terminal 191 of the opposite motor winding 181, the opposite terminal 192 of said winding 181 being connected by a wire 193 to a contact element 194.

The opposite side 195 of the line is connected by a wire 196 to a binding post 197 at one end of a carbon-pile rheostat 198. A plunger or compressor element 199 is mounted in the opposite end of the rheostat 198 and carries on its inner end a contact element (not shown) adapted to make contact with the uppermost piece of the carbon-pile. The element 199 is provided with a collar or flange 200, and a spring 201 sleeved on said element 199 bears at its one end against the collar 200 and at its other end against the casing of the rheostat 198, normally to hold the contact element on the compressor 199 resiliently out of contact with the carbon-pile. At its upper end, the plunger 199 preferably carries an anti-friction element such as the roller 202.

A pair of rails 203 and 204 are mounted above the rheostat 198, said rails being formed in their adjacent surfaces with parallel opposed grooves 205. A block 206 is provided with laterally extending bosses or flanges 207 and 208 respectively received in the grooves of the rails 203 and 204. It will be seen that the block 206 is thus mounted for reciprocation, being guided by the rails 203 and 204.

The block 206 is formed in its under surface with a notch providing opposed cammed faces 209 and 210 operatively associated with the anti-friction member 202 at the upper end of the plunger 199. The block 206 is formed in its upper surface with a notch upon the opposed walls of which are mounted the contact elements 189 and 194 above mentioned.

An operating member 211, corresponding to the members 34, 80, 113, 145, and 177, respectively, of Figs. 1, 2, 3, 4, and 5, is provided with a finger 212 disposed within said notch and in alignment with the contact elements 189 and 194. The finger 212 carries a contact element 213 for cooperation with the element 214 for cooperation with the element 194. A flexible lead 215 connects both of the said elements 213 and 214 with the contact element carried by the plunger 199.

If the operating member 211 is shifted toward the right, as viewed in Fig. 6, the contact 213 will engage the contact element 189. Since, however, the spring 201 is holding the plunger 199 and its contact element out of contact with the carbon-pile within the rheostat 198, no circuit is established until the member 211 has been moved far enough to shift the block 206 toward the right. As said block is shifted, the cammed surface 209 cooperates with the roller 202 to depress the plunger 199, thus establishing a circuit as follows: 183, 184, 185, 182, 188, 189, 213, 215, 198, 197, 196, and 195 to operate the motor 180 under the influence of the winding 182. As the operation of the motor 180 returns the operating member 211 toward neutral position, the spring 201 elevates the plunger 199 to break that circuit, whereafter the contact 213 will be moved away from the contact element 189. It will be seen that circuits are always made and broken within the rheostat 198, the contacts 189, 213, 194, and 214 being closed before the circuit is made and opened after the circuit is broken.

Obviously, operation of the motors 180 under the influence of the winding 181 will be effected by opposite movement of the operating member 211; and as obviously, operation of the motor 180 in either direction will be controlled, as to speed, by the rheostat 198.

I claim as my invention:

1. In combination, a motor, a threaded shaft driven by said motor, an element threadedly associated with said shaft and shiftable longitudinally of said shaft by rotation of said shaft, means dominated by said element for controlling operation of said motor, and means excluding said shaft for shifting said element.

2. In combination, a reversing motor, a threaded shaft driven by said motor, an element threadedly associated with said shaft and shiftable in opposite directions axially of said shaft by opposite rotation of said shaft, and means dominated by said element for controlling operation of said motor, said element being oppositely shiftable without affecting said shaft.

3. In combination, a reversible electric motor, and a control unit for said motor adapted to control the speed and direction of rotation of said motor, said unit including a member movable in one direction to effect rotation of said motor in one direction, and operatively connected to said motor whereby rotation of said motor in said one direction tends to return said member to a position of neutrality to stop said motor, movement of said member in said one direction having no effect upon said operative connection.

4. In combination, a reversible electric motor, and a control unit for said motor adapted to control the speed and direction of rotation of said motor, said unit including a member movable by external means in opposite directions to effect corresponding rotation of said motor in opposite directions, said member being operatively connected to said motor whereby rotation of said motor in response to such movement of said member tends to return said member to a position of neutrality to stop said motor, movement of said member by said external means having no effect upon said operative connection.

5. The combination with a variable-speed transmission including a shiftable element operable to vary the speed ratio between the intake and output shafts thereof by infinitesimal increments, of a reversible, variable-speed motor connected to shift said shiftable element and provided with opposite windings, parallel circuits for energizing said windings, and means for selectively controlling the course and intensity of current flow in said respective circuits.

6. The combination with a variable-speed transmission including a shiftable element operable to vary the speed ratio between the intake and output shafts thereof, and a shaft operatively connected to said element whereby rotation of said shaft in opposite directions effects opposite shifting of said element, of a reversible electric motor connected to rotate said shaft, and a control unit for said motor adapted to control the speed and direction of rotation of said motor, said unit including a member movable in one direction to effect rotation of said motor in one direction, and operatively connected to said motor whereby rotation of said motor in said one direction tends to return said member to a position of neutrality to stop said motor.

7. The combination with a variable-speed transmission including a shiftable element operable to vary the speed ratio between the intake and output shafts thereof, and a shaft operatively connected to said element whereby rotation of said shaft in opposite directions effects opposite shifting of said element, of a reversible electric motor connected to rotate said shaft, and a control unit for said motor adapted to control the speed and direction of rotation of said motor, said unit including a member movable by external means in opposite directions to effect corresponding rotation of said motor in opposite directions, said member being operatively connected to said motor whereby rotation of said motor in response to such movement of said member tends to return said member to a position of neutrality to stop said motor.

8. The combination with an electric motor having a plurality of separate windings, a source of electrical energy, a constantly closed circuit including said source and one of said windings, a constantly closed parallel circuit including said source and another of said windings, a carbon-pile resistor connected in series with said first-mentioned winding, a second carbon-pile resistor connected in series with said second-mentioned winding, means cooperable with both of said resistors and effective to compress the pile of one of said resistors and simultaneously to relieve the pile of the other of said resistors, and means to balanced condition, upon operation of said motor.

9. In combination, a reversible electric motor provided with opposite windings, a source of electrical energy, means connecting said respective windings with said source in parallel circuits, a rheostat connected in series in each of said parallel circuits, a lever pivoted at a fixed point, a link having its one end pivoted to said lever intermediate the ends thereof, an element shiftable by said motor, a second link having one end pivoted on said element, and a third link having its opposite ends pivoted to the free ends of said first and second links, and operatively associated with said rheostats.

10. In combination, a reversible electric motor provided with opposite windings, a source of electrical energy, a constantly closed circuit connecting said source with one of said windings, a carbon-pile rheostat connected in said circuit in series with said winding, a second constantly closed circuit parallel with said first circuit and connecting said source with the other of said windings, a second carbon-pile rheostat connected in said second circuit in series with the winding therein, a lever pivoted at a fixed point, a link having its one end pivoted to said lever intermediate the ends thereof, an element shiftable by said motor, a second link having one end pivoted on said element, and a third link having its opposite ends pivoted to the free ends of said first and second links, and operatively associated with said rheostats, whereby movement of said last-named link in either direction from a position of neutrality compresses the pile of one of said rheostats and relieves the pile of the other of said rheostats.

11. In combination, a variable-speed transmission unit comprising a threaded shaft, and an element threadedly engaged with said shaft and shiftable in opposite directions by opposite rotation of said shaft, a reversible electric motor connected to drive said shaft, said motor being provided with opposite windings, a source of electrical energy, means connecting said respective windings with said source in parallel circuits, a rheostat connected in series in each of said parallel circuits, a lever pivoted at a fixed point on said unit, a link having its one end pivoted at a point intermediate the ends of said lever, a second link having its one end pivoted on said element, and a link having its opposite ends pivoted to the free ends of said first and second links and operatively associated with said rheostats.

12. In combination, a variable-speed transmission unit comprising a threaded shaft, and an element threadedly engaged with said shaft and shiftable in opposite directions by opposite rotation of said shaft, a reversible electric motor connected to drive said shaft, said motor being provided with opposite windings, a source of electrical energy, a constantly closed circuit connecting said source with one of said windings, a carbon-pile rheostat connected in said circuit in series with said winding, a second constantly closed circuit parallel with said first circuit and connecting said source with the other of said windings, a second carbon-pile rheostat connected in said second circuit in series with the winding therein, a lever pivoted at a fixed point on said unit, a link having its one end pivoted at a point intermediate the ends of said lever, a second link having its one end pivoted on said element, and a link having its opposite ends pivoted to the free ends of said first and second links and operatively associated with said rheostats, whereby movement of said last-named link in either direction from a position of neutrality compresses the pile of one of said rheostats and relieves the pile of the other of said rheostats.

13. The combination with an electric motor provided with a plurality of windings, of a control unit therefor comprising an induction coil connected in a dead circuit with one of said windings, a second induction coil connected in a dead circuit with another of said windings, a live coil, and means for shifting said live coil to vary the energizing effect thereof on said induction coils.

14. In combination, a variable-speed transmission unit comprising a threaded shaft and an element threadedly engaged with said shaft and shiftable in opposite direction by opposite rotation of said shaft, a reversible electric motor connected to drive said shaft, said motor being provided with opposite windings, an induction coil connected in a dead circuit with one of said windings, a second induction coil connected in a dead circuit with the other of said windings, a source of electrical energy, a live coil constantly connected in circuit with said source, and means for shifting said live coil to energize selectively said respective induction coils to effect operation of said motor in opposite directions.

15. In combination, a reversible electric motor provided with opposite windings, an induction coil connected in a dead circuit with one of said windings, a second induction coil connected in a dead circuit with the other of said windings, a source of electrical energy, a live coil constantly connected in circuit with said source, and means for shifting said live coil to energize selectively said respective induction coils to effect operation of said motor in opposite directions.

16. In combination, a variable-speed transmission unit comprising a threaded shaft and an element threadedly engaged with said shaft and shiftable in opposite direction by opposite rotation of said shaft, a reversible electric motor connected to drive said shaft, said motor being provided with opposite windings, an induction coil connected in a dead circuit with one of said windings, a second induction coil connected in a dead circuit with the other of said windings, a source of electrical energy, a live coil constantly connected in circuit with said source, and means for shifting said live coil to energize selectively and in varying degrees said respective induction coils to effect operation of said motor in opposite directions and at varying speeds.

17. In combination, a reversible electric motor provided with opposite windings, an induction coil connected in a dead circuit with one of said windings, a second induction coil connected in a dead circuit with the other of said windings, a source of electrical energy, a live coil constantly connected in circuit with said source, and means for shifting said live coil to energize selectively and in varying degrees said respective induction coils to effect operation of said motor in opposite directions and at varying speeds.

18. In combination, a variable-speed transmission unit comprising a threaded shaft and an element threadedly engaged with said shaft and shiftable in opposite direction by opposite rotation of said shaft, a reversible electric motor connected to drive said shaft, said motor being provided with opposite windings, an induction coil connected in a dead circuit with one of said windings, a second induction coil connected in a dead circuit with the other of said windings, a source of electrical energy, a live coil constantly connected in circuit with said source, and means for shifting said live coil to energize selectively said respective induction coils to effect operation of said motor in opposite directions, said means comprising a pivoted arm carrying said live coil and shiftable to move said live coil selectively into and out of proximity with said respective induction coils, a lever, means connecting said arm with said lever, and means connecting said last-named means with said element.

19. In combination, a reversible electric motor provided with opposite windings, an element shiftable in opposite directions by operation of said motor in opposite directions, an induction coil connected in a dead circuit with one of said windings, a second induction coil connected in a dead circuit with the other of said windings, a source of electrical energy, a live coil constantly connected in circuit with said source, and means for shifting said live coil to energize selectively said respective induction coils to effect operation of said motor in opposite directions, said means comprising a pivoted arm carrying said live coil and shiftable to move said live coil selectively into and out of proximity with said respective induction coils, a lever, means connecting said arm with said lever, and means connecting said last-named means with said element.

20. The combination with a reversible electric motor having a forward winding and a reverse winding, of a source of electrical energy, means connecting said windings in parallel with one side of said source, a carbon-pile switch rheostat connected to the other side of said source, said switch rheostat including a contact element and means normally resiliently holding said element out of contact with the carbon-pile, a reciprocable member having a pair of cam faces operatively associated with said element whereby movement of said member in either direction from a neutral position moves said contact element into contact with such pile and compresses such pile, a pair of spaced opposed contacts carried by said member and connected, respectively, to said motor windings, an operating arm having a finger interposed between said contacts and movable to shift said member, and positioned to make electrical contact, selectively, with said member contacts, and means providing an electrical connection between said contact element and said finger.

21. The combination with a reversible electric motor having a forward winding and a reverse winding, of a source of electrical energy, means connecting said windings in parallel with one side of said source, a carbon-pile rheostat having one end connected to the other side of said source, a compressor for said pile, means resiliently holding said compressor in position permitting relaxation of said pile, a reciprocable member having a pair of cam faces operatively associated with said compressor whereby movement of said member in either direction from a neutral position moves said compressor to compress said pile, a pair of spaced opposed contacts carried by said member and connected, respectively, to said motor windings, an operating arm having a finger interposed between said contacts and movable to shift said member, and positioned to make electrical contact, selectively, with said member contacts, and means connecting said finger to the other end of said rheostat.

WILLIAM R. PERRY.